United States Patent [19]

McComb

[11] 3,781,876
[45] Dec. 25, 1973

[54] ROTARY ELECTROMAGNETIC INDICATOR

[75] Inventor: Richard C. McComb, Newington, Conn.

[73] Assignee: Veeder Industries, Inc., Hartford, Conn.

[22] Filed: Oct. 12, 1971

[21] Appl. No.: 188,294

Related U.S. Application Data

[63] Continuation-in-part of Ser. No. 814,620, April 9, 1969, abandoned.

[52] U.S. Cl......... 340/378 MW, 310/49 R, 310/156
[51] Int. Cl.............................................. G09f 11/10
[58] Field of Search ........ 340/319, 324 S, 378 MW; 310/49 R, 156

[56] References Cited
UNITED STATES PATENTS

| | | | |
|---|---|---|---|
| 2,943,313 | 6/1960 | Gordon et al.................. | 340/378 R |
| 3,089,131 | 5/1963 | Morgan.............................. | 340/319 |
| 3,118,138 | 1/1964 | Milas et al. ......................... | 340/378 |
| 3,375,512 | 3/1968 | Watkins et al.......... | 340/378 MW X |
| 3,392,382 | 7/1968 | Pursiano et al. ............. | 340/324 R X |
| 3,411,154 | 11/1968 | Watkins...................... | 340/378 MW |
| 3,411,155 | 11/1968 | Watkins...................... | 340/378 MW |
| 3,419,858 | 12/1968 | Silverman et al........... | 340/378 MW |
| 3,470,509 | 9/1969 | Silverman et al........... | 340/378 MW |
| 3,478,288 | 11/1969 | Silverman et al........... | 340/378 MW |
| 3,482,126 | 12/1969 | Bradley............................ | 310/49 R |

Primary Examiner—Kenneth N. Leimer
Attorney—John M. Prutzman et al.

[57] ABSTRACT

A non-blinking rotary electromagnetic indicator having an annular stator with equiangularly spaced radially inwardly extending salient poles with windings disposed thereon and a rotor with a permanent magnet rotatable into alignment with the salient poles in accordance with the operation of the stator windings and a symbol bearing drum encircling the stator. A rotor vane of ferromagnetic material is provided next to each pole of the rotor magnet angularly offset from the magnetic axis of the permanent magnet and extending outwardly of the permanent magnet pole to provide a turning force on the rotor when it is to be rotated to a 180° opposite position.

1 Claim, 12 Drawing Figures

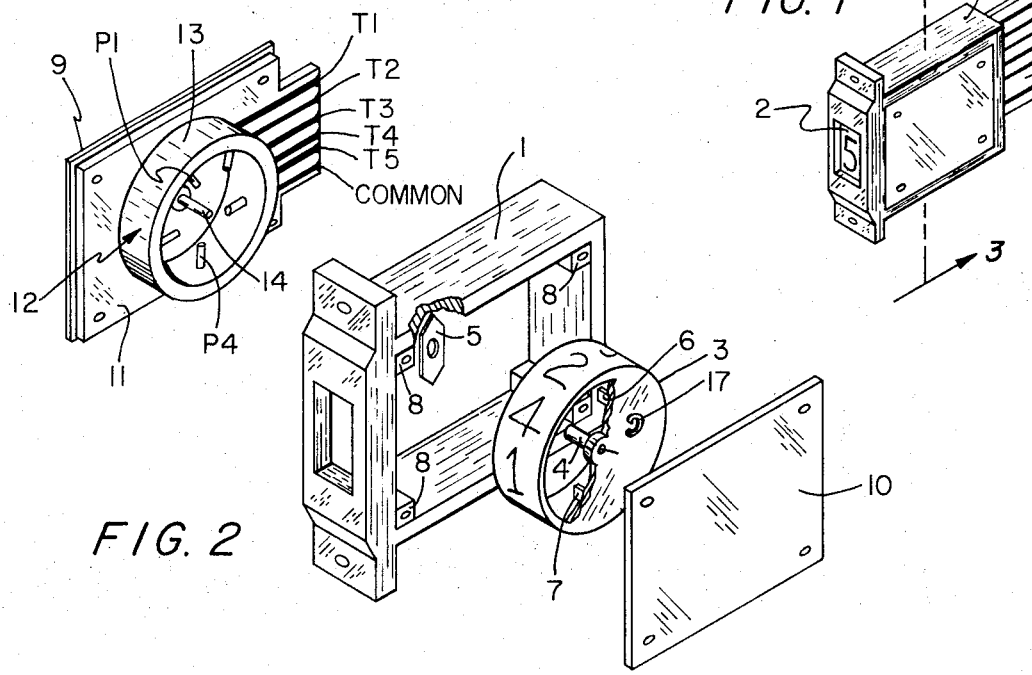
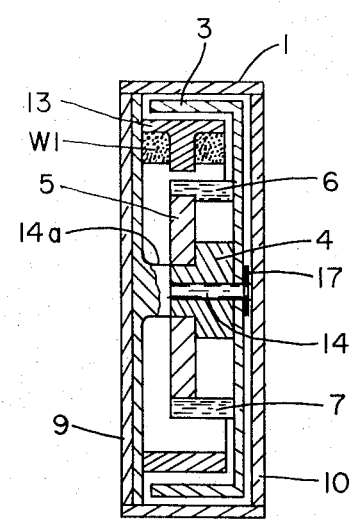
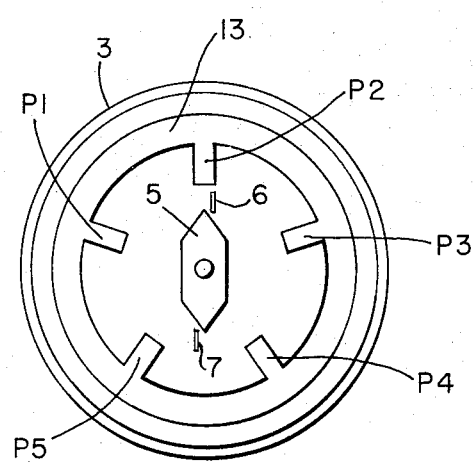
INVENTOR.
RICHARD C. McCOMB
BY Louis Orenbuch
ATTORNEY INVENTOR
RICHARD C. McCOMB
By Louis Orenbuch
ATTORNEY

ROTARY ELECTROMAGNETIC INDICATOR

The present application is a continuation-in-part application of my co-pending application, Ser. No. 814,620, filed Apr. 9, 1969 entitled "Non-Blinking Electromagnetic Indicator," now abandoned.

BRIEF SUMMARY OF THE INVENTION

This invention relates in general to rotary indicators of the type employing an annular electromagnetic stator which governs the orientation of a rotor upon which symbols are marked. In this type of indicator, symbols on the rotor are diametrically opposed and any symbol can be brought into view in a window of the indicator by appropriately energizing the windings of the electromagnetic stator. The operation of the indicator, thus, requires the rotor to be able to assume 180° opposed positions. The invention, more particularly, pertains to a rotary electromagnetic indicator that is constructed to insure a turning force on the rotor whenever the rotor is required to turn a 180° opposite position and which insures accurate detenting of the rotor in the interval when the stator is electrically deenergized.

DISCUSSION OF THE PRIOR ART

Rotary electromagnetic indicators upon which this invention is an improvement are of the type employing a rotor having a permanent magnet fixed to a drum on which symbols are marked. An annular electromagnetic structure, termed the stator, is arranged, upon being energized by an electrical signal, to establish a discretely oriented magnetic field. For each symbol on the drum, there is a corresponding uniquely oriented magnetic field that can be established by the stator. The electrical signal applied to the stator determines which one of those fields is established. In response to the establishment by the stator of the discretely oriented magnetic field, the rotor turns to align its permanent magnet with the stator's magnetic field. The symbol bearing drum, being fixed to the permanent magnet, rotates with the magnet and assumes a fixed station when the magnet is aligned with the stator's field. The rotor and stator are housed in a structure having a window permitting only one of the drum's symbols to be visible in its entirety. In many of the prior art designs the symbols are located on the drum so that for each position of the permanent magnet established by the energized stator a different symbol is presented in the window in an uncentered position. Upon termination of the electrical signal applied to the stator, the symbol moves to a centered position in the window. This action results from the permanent magnet of the rotor being pulled to an "offset" position when the stator's magnetic field decays upon cessation of the energizing electrical signal. The rotor is held in its "offset position" after cessation of the stator's electrical signal by the attractive force exerted by the permanent magnet upon the ferromagnetic core of the stator or upon magnetizable detent elements fixed to the stator. The indicator rotor is retained in the offset position until the indicator is again actuated by an electrical signal to the stator.

To permit the symbols on the drum to be of uniform and maximum size, the symbols are symmetrically disposed around the entire circumference of the drum. That is, the symbols are spaced at regular intervals around the drum's periphery and where there are an even number of symbols, one symbol is diametrically opposite another symbol. That arrangement uses the peripheral surface area of the drum as fully as possible, but requires for an even number of symbols that the stator be capable of establishing magnetic fields that are oriented in 180° opposite directions. Because of that requirement, in an indicator that does not provide for "offset" positioning of the rotor when the stator is deenergized, the rotor tends to "hang-up" when 180° oppositely directed fields are established in succession by the stator. That is, in the absence of offset, the rotor initially tends to move sluggishly or not at all when it is commanded to turn to a 180° opposite position. To obtain offset, prior art indicators use magnetizable detents as taught by U. S. Pat. No. 2,943,313 to Gordon et al. or use the winding arrangement disclosed in U. S. Pat. No. 3,311,911 to Pursiano et al. or use a magnetic shunting member in the manner disclosed in U. S. Pat. No. 3,392,382. The use of offset has proved effective in avoiding hang up of the rotor. However, the movement of the drum symbol in the window when the rotor turns to its offset position causes a perceptible "blink" in the indicator's operation.

U. S. Pat. No. 3,419,858 discloses an indicator employing magnetizable pins on the rotor to assure a turning moment on the rotor when 180° rotation is required. The indicator is arranged so that the pins, according to the disclosure, do not pull the rotor to an offset position when the stator becomes deenergized. The sole function of the pins is to insure that the rotor will not hang-up when 180° rotation is required. The pins tend to interfere with the permanent magnet's alignment with the magnetic field of the electrically energized stator. To minimize that interference, the disaligning effect of the pins is made very weak relative to the aligning force of the permanent magnet. However, it is this disalignment effect that produces the turning force on the rotor when 180° rotation is required. The turning force that the pins can provide, therefore, is severely limited. Further, when the stator is electrically deenergized, the pins have no appreciable effect in maintaining the rotor in position. That is, the pins do not contribute to holding the rotor in a fixed station in the interval when no signal is applied to the stator.

THE INVENTION

This invention concerns electromagnetic indicators of the type having a rotor employing a symbol bearing drum whose position is magnetically governed and whose operation requires the rotor to be able to assume 180° opposite positions. The principal objective of this invention is to provide for insuring that a turning force will be exerted on the rotor when ever the rotor is required to turn to a 180° opposite position. A further object of the invention is to provide a rotary indicator that does not blink during operation and which therefore provides for maintaining accurate registration of the indicator symbols in the indicator window. In accordance with a preferred embodiment of the invention, the stator of the indicator has a circular array of radial poles on which windings are disposed. By selectively energizing the windings, any one of a plurality of discretely oriented magnetic fields can be established. By reversal of the polarity of a radial pole, magnetic fields that are oriented in 180° opposite directions can be established in succession by the stator. Under the influence of the stator's field, a permanent magnet fixed to the symbol bearing drum causes the rotor to turn until the permanent magnet is aligned with the field. To insure the presence of a turning force on the rotor when the rotor has been initially aligned with one discretely oriented stator field and is next required to turn into alignment with a 180° oppositely oriented stator field, a "soft iron" ferromagnetic vane is affixed to the rotor in a position where the 180° opposite field causes a turning force on the rotor. The vane is angularly offset from the magnetic axis of the permanent magnet and is situated adjacent a pole of the permanent magnet and to extend radially beyond the rotor magnet pole to provide a partial low reluctance path between the rotor magnet pole and stator pole. The vane and rotor magnet together provide for holding the rotor on station upon cessation of the electrical signal to the stator. This function is termed "detenting" because it establishes a precise station for the rotor which assures the symbol being correctly registered in the window, and maintains the rotor in that station in the interval when the stator is deenergized.

THE DRAWINGS

The invention, both as to its construction and its mode of operation, can be better understood from the following description when it is considered in conjunction with the accompanying drawings in which:

FIG. 1 is a perspective view of an embodiment of a rotary electromagnetic indicator incorporating the present invention;

FIG. 2 is an enlarged partly exploded perspective view, partly broken away and partly in section, of the electromagnetic indicator;

FIG. 3 is an enlarged section view of the indicator taken substantially along line 3—3 of FIG. 1;

FIG. 5 is an enlarged generally schematic side elevation view of the electromagnetic indicator showing the stator core and rotor magnet and vanes of the indicator;

DESCRIPTION OF THE PREFERRED EMBODIMENTS

Figure 4:
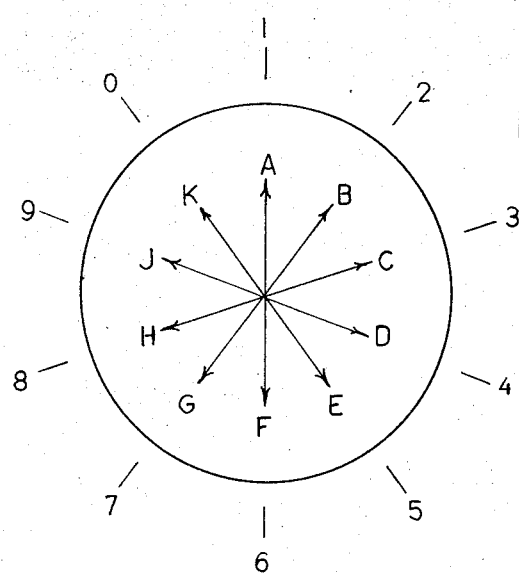
FIG. 4 is a schematic representation of the arrangement of symbols on a drum of the electromagnetic indicator.

Referring now to the drawings in detail, FIG. 1 depicts the external appearance of a rotary electromagnetic indicator incorporating the present invention.

The indicator employs a housing 1 having a front panel containing a window 2 for displaying symbols carried, as shown in FIG. 2, upon the periphery of a drum 3. Each symbol is of a size which fills the window of the housing so that only one symbol can be completely within the window at any time. The symbols shown are the arabic decimal numerals 0, 1, 2, ... 7, 8, 9. However, it is readily apparent that such numerals can be replaced by other symbols and that in place of each numeral symbol a word symbol or other "message" can appear. The symbols are preferably of uniform size and, to accommodate the maximum number of symbols, the symbols, as schematically indicated in FIG. 4 are preferably equiangularly spaced around the drum. Drum 3 is preferably made of a non-magnetic material and, as depicted in FIG. 2 and 3, has a hub 4 to which an elongated permanent magnet 5 is secured. The permanent magnet 5 is mounted symmetrically with respect to the rotor axis and with its magnetic axis passing through the rotor axis. The magnet 5 has "salient" poles in the sense that the magnet's magnetic flux is concentrated at points which sharply define the North and South magnetic poles.

The drum and permanent magnet comprise a rotor that is mounted to turn as a unit. Secured to the drum are a pair of magnetizable or ferromagnetic vane elements 6 and 7 which, as shown in FIGS. 3 and 5, extend axially along the edge of the permanent magnet 5 and (in the shown embodiment) along the full thickness of the permanent magnet 5. The vanes are positioned, as shown in FIGS. 3 and 5, adjacent to the ends or poles of the permanent magnet 5 angularly offset from the rotor magnet poles and therefore angularly offset from the magnetic axis of the rotor magnet. Also, the vanes 6 and 7 are positioned to provide a slight effective air gap between the rotor magnet 5 and vanes such that the active vane 6 & 7 provides a partial low reluctance path between the rotor magnet pole and an adjacent stator pole (as shown in FIG. 5) when the poles have opposite polarity and such that the vane is adapted to be captured by the stator field when the polarity of the stator pole is reversed.

The housing 1, illustrated in FIG. 2, is a hollow rectangular body having posts 8 at its corners. The front panel, preferably, is an integral part of the housing. The posts are internally threaded to permit end plates 9 and 10 to be secured to opposite sides of the body by screws which engage the threaded posts. A printed circuit board 11, having its wiring protected by an insulative coating, is preferably clamped against the housing end plate 9. As several indicators may be mounted side by side or an indicator may be used in an environment where external magnetic fields of appreciable strength are present, the end plates are preferably composed of a material of high magnetic permeability to cause those plates to act as magnetic shields.

Figure 6:
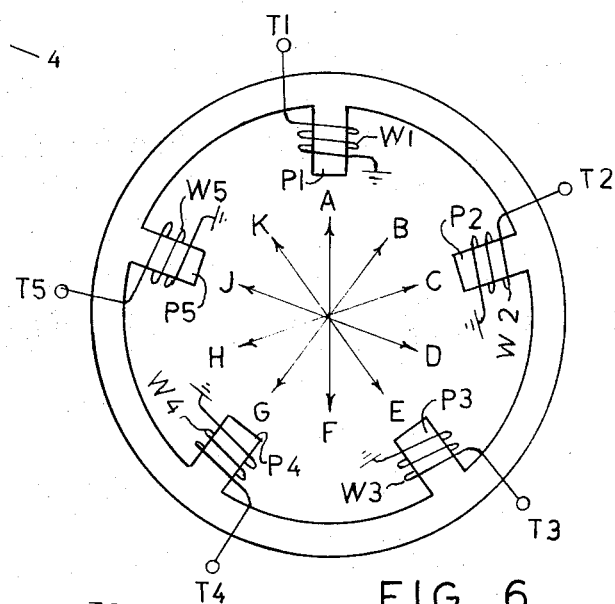
FIG. 6 is an enlarged generally schematic side elevation view of the electromagnetic indicator illustrating the stator windings and the magnetic field orientations that can be established by the stator.

Printed circuit board 11, as shown in FIG. 1, extends beyond the rear of the housing 1 and provides terminals T1, T2, T3, T4, T5 and a COMMON through which electrical signals can be applied to a stator 12. The stator is secured upon the board 11 and employs a ferromagnetic annular core 13 having inwardly protruding equiangularly spaced radial poles P1, P2, P3, P4, P5 upon which windings W1, W2, ... W5 are mounted. In FIG. 2, the windings have been omitted to better show the inwardly protruding radial poles. The arrangement of the windings on the poles is schematically depicted in FIG. 6. Each winding can be separately energized by applying an electrical signal between the COMMON terminal and one of the terminals T1, T2, . . . T5. Extending through the geometric center of the annular core is a shaft 14 which, as shown in FIGS. 2 and 3, is secured to the printed circuit board. The drum 3 of the rotor has a central aperture 15 which permits it to be mounted over the shaft. When so mouned, drum 3 encircles the stator whereas the permanent magnet 5 and the vanes 6, 7 are within the enclosure formed by the stator. The vanes 6, 7 ae disposed to travel when the rotor turns, so that the outer ends of the vanes move in a circular path that is close to but is radially spaced slightly inwardly of the inner ends of the stator poles. To retain the rotor so that it cannot slip off shaft 14, a groove is provided near the shaft's end for accommodating a c-shaped lock member 17. Shaft 14, has an enlarged portion 14a, best shown in FIG. 3, which provides a shoulder against which hub 4 bears to position the permanent magnet 5 in the same plane as the stator's radial poles. In more sophisticated embodiments of the invention, where the indicator must respond rapidly to command signals, self-aligning jewelled bearings or ball bearings can be employed to facilitate turning of the rotor.

FIG. 6 depicts, in schematic form, the stator of the indicator having its five radial poles P1, P2, . . . P5 spaced at regular intervals around the annular core. Preferably, the poles and the windings W1, W2, . . . W5 are similar so that the magnetic field established by electrical energization of any winding is substantially equal in intensity to the magnetic field established by each of the other windings. The magnetic field established by the stator can be prepresented by a vector whose direction is toward the North magnetic pole and whose length is a measure of the magnetic field intensity. For example, on applying an electrical signal at terminal T1 to winding W1, a current is caused to flow in the winding in the direction causing the tip of pole P1 to become a North magnetic pole. The magnetic field established by the stator can be represented by the A vector. Upon reversal of the current flow in the W1 winding, pole P1 becomes a South magnetic pole and the magnetic field of the stator then can be represented by the F vector. Therefore, for each radial pole either of two magnetic field vectors which are 180° opposite in direction can be established by controlling the direction of current flow in the winding. Most simply, the direction of current flow can be controlled by the polarity, referred to the COMMON terminal, of the electrical signal applied at terminal T1. In FIG. 6, the ten magnetic field orientations that can be established by energizing the windings on the five radial poles are indicated by the vectors A, B, . . . K.

The relation of the vectors A, B, . . . K to the location of the symbols on the drum is shown in FIG. 4. For each vector which represents a discretely oriented magnetic field, there corresponds a symbol on the drum which is placed in register in the indicator's window when that vector is established by the stator. This action occurs because the permanent magnet 5 of the rotor, under the influence of the stator's magnetic field, constrains the rotor to turn to permit the magnet to align itself with the stator's field. When the permanent magnet is aligned with the stator's field, the appropriate symbol on the drum is in register in the housing's window.

Figure 7:
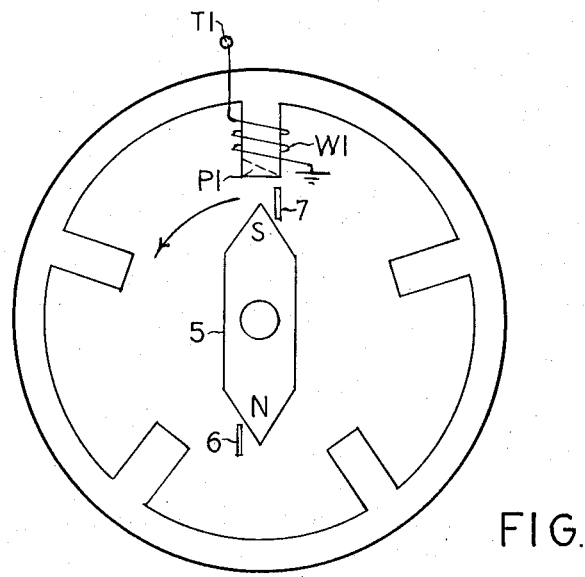
FIGS. 7 & 8 are enlarged generally schematic side elevation views of the electromagnetic indicator illustrating the operation of the indicator with rotor vanes of different magnetic characteristics.

Assuming, for example, that winding W1 is energized by an electrical signal, applied at terminal T1, which causes the stator to establish the magnetic field represented by vector A, the tip of radial pole P1 becomes a North magnetic pole. Permanent magnet 5, as indicated in FIG. 7, is constrained by the stator's field to cause the rotor to turn to the position where the permanent magnet is aligned with field vector A. When so aligned, the South pole of the rotor magnet points to the radial pole P1 and the vane 7 is disposed in the air gap between the rotor magnet and the radial pole P1. Where the vane 7 is made of a magnetizable substance, such as soft iron, which provides a low reluctance path for magnetic flux, it tends to distort the stator's magnet field. However, where the mass of the vane is relatively small as shown. The vane is saturated by the magnetic flux pssing between the rotor and stator poles, and the angular bias on the rotor caused by the force of attraction between the vane and stator pole is counterbalanced by an equal and opposite angular bias on the rotor caused by the force of attraction between the rotor magnet pole and stator pole, it being understood that the rotor magnet pole is only vey slightly off center of the stator pole. Also, by slanting the tip of the radial pole as indicated by the broken line in FIG. 7, the static position of the rotor with the stator energized can be more precisely located since rotation of the rotor from such position would increase. the air gap between the vane and the tip of the radial pole, and the rotor consequently, tends to remain in the position where that air gap is a minimum. That air gap is at a minimum when the rotor is situated in the position depicted in FIG. 7.

Upon cessation of the electrical signal at terminal T1, the stator's magnetic field collapses. The rotor, however, remains in position because the permanent magnet of the rotor now supplies the magnetic force to maintain its alignment with radial pole P1. That is, the stator core provides a low reluctance magnetic circuit for the permanent magnet 5. The flux of the permanent magnet seeks the path of least reluctance and the rotor remains in substantially the same angular position it had when the stator was energized and such that a portion of the magnetic flux from the permanent magnet 5 passes through the adjacent ferromagnetic vane and another portion of the magnetic flux passes directly from the rotor magnet to the stator pole without passing through the vane. The vane also aids in accurately holding the rotor in a "detented" station when the stator is deenergized. In the detented station, a symbol on the drum is fully presented in the window of the indicator. As the vane does not have the effect of angularly shifting the rotor to an offset angular position when the stator is deenergized the indicator does not blink.

Assuming the polarity of the next electrical signal applied at terminal T1 is such as to cause the current in winding W1 to flow in the direction making the tip of pole P1 a South magnetic pole, the magnetic field established by the energized stator is then represented by the vector F which is oriented 180° opposite to vector A. The South pole of permanent magnet 5 is repelled by the adjacent radial pole P1. The repelling force is directed generally towards but it is believed slightly off the pivotal axis of the rotor and such that a turning force in the counterclockwise direction as viewed in FIG. 7, is exerted on the rotor. Also the vane 7 is captured by the stator field and such that the vane is attracted by stator pole to create an additional turning force, in the counterclockwise direction as viewed in FIG. 7. The combined turning forces provide for initiating rotation of the rotor and the accompanying increase in repulsion of the permanent magnet provides for rotating the permanent magnet 180° into alignment with the F vector.

The foregoing operation of the rotor is believed to be best explained as follows. When the opposed salient poles of the permanent magnet and stator have opposite polarity the vane is magnetized by the permanent magnet and forms of offset partial low reluctance path between the rotor magnet and stator pole such that both the vane and permanent magnet are attracted by the salient pole of the stator and this combined attraction provides for positioning the rotor. Accordingly, with the stator energized, although the rotor magnet pole is aligned substantially centrally with the stator pole, the rotor magnet pole is positioned slightly off center due to the rotor torque component resulting from the attraction of the vane alone which is equal and opposite the rotor torque component from the attraction of the rotor magnet alone. The magnetic force components on the rotor magnet pole and vane, when added vectorily, produce a resultant force directed through the rotor axis.

When the stator is deenergized, the vane remains magnetized by the rotor magnet and both the rotor magnet pole and vane are attracted to the stator pole with less force but with substantially the same relative force components such that the resultant force continues to pass through the rotor axis and as a result the rotor does not rotate or blink when the stator is deenergized.

When the polarity of the stator pole is reversed to reposition the rotor 180° (and so that the active stator pole has the same polarity as the opposed rotor magnet pole) the stator captures the vane from the rotor magnet due to the more intense magnetic field produced by the stator to attract the vane and thereby place an angular bias on the rotor, in the counterclockwise direction as viewed in FIG. 7. At the sqme time, magnetic repulsion between the rotor magnet pole and the stator pole provides an additional angular bias on the rotor in the same angular direction and such that the resultant angular bias in the rotor provides for rotating the rotor away from its static position.

From a somewhat different point of view, the effect of the vane 7 is explainable in terms of the interacting magnetic fields of the stator and permanent magnet. When the winding W1 is electrically energized to cause the end of radial pole P1 to become a South magnetic pole, the field of the stator, represented by vector F, is substantially opposed to the field of the permanent magnet.

The magnetic flux of the stator's field, being opposed by the field of the permanent magnet, seeks the path of least reluctance. The stator's field, consequently, shifts toward the vane 7, causing the vector F to shift so that it is no longer 180° opposite to the magnetic field of the permanent magnet. The shift of vector F produces a torque on the rotor magnet which causes the rotor to turn in the counterclockwise direction as viewed in FIG. 7. Once the rotor commences to turn, the torque rapidly increases. The rotor magnet, therefore, rotates 180° and assumes the station where its field aids the field of the stator. In that station, the flux of the stator's field finds a low reluctance path though the permanent magnet and the vane then has no appreciable field distorting effect.

Figure 8:
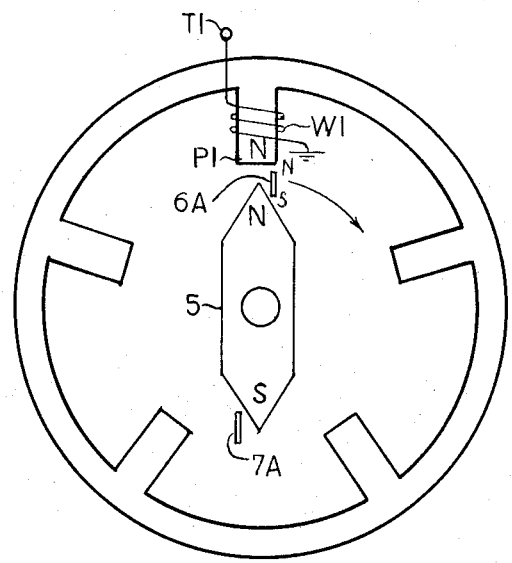

In the preferred embodiment of the invention, the vane is a thin, flat plate of material such as soft iron having high magnetic permeability and low magnetic retentivity (and therefore capable of readily changing its magnetic state). By employing a vane of a material exhibiting appreciable magnetic hysteresis or retentivity, the effect on the vane would be altered to bias the rotor in the clockwise direction rather than in the counterclockwise direction when the stator polarity were reversed. In FIG. 8, the rotor magnet's North pole is adjacent to radial pole P1 of the stator with the vane 6A in the gap. Assuming the stator is deenergized and the vane is of a material exhibiting appreciable magnetic retentivity, the vane, as a result of the magnetism of the permanent magnet 5, would act like a small bar magnet having the designated magnetic poles. Thus, when winding W1 is energized to make pole P1 a North magnetic pole, as illustrated in FIG. 8, the vane would resist changing its magnetic state and would consequently be angularly biased, in the clockwise direction as viewed in FIG. 8 due to magnetic repulsion. Since the angular bias on the vane would then be opposite to the angular bias on the rotor magnet, the resultant angular bias on the rotor if any would therefore be less than the resultant angular bias on the rotor where the vane is formed of a ferromagnetic material of low retentivity.

Figure 9:
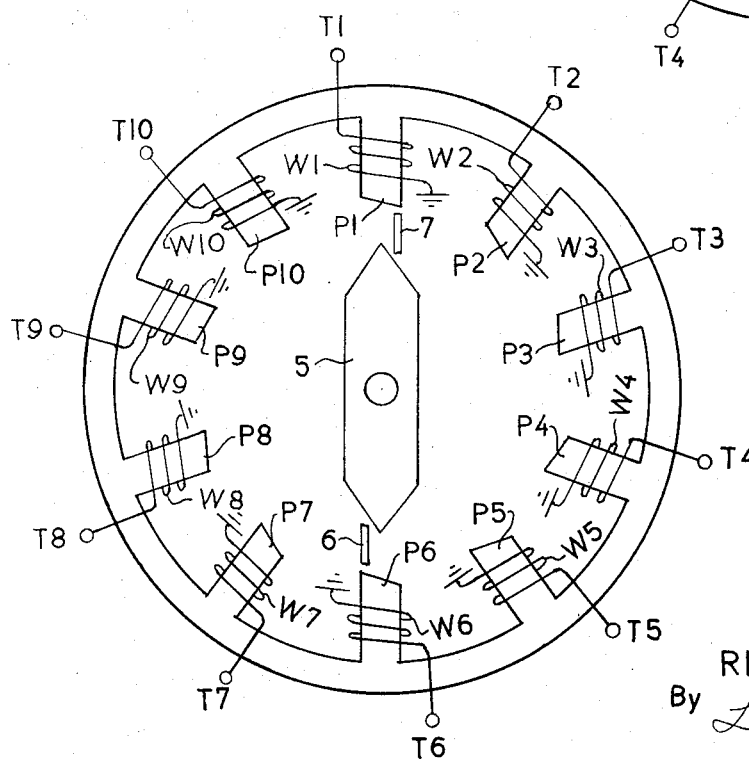
FIG. 9 is an enlarged generally schematic side elevation view showing the stator core and rotor magnet and vanes of another embodiment of an electromagnetic indicator incorporating the present invention.

The stator need not be of the type employing reverse polarity electrical signals. For example, a stator of the type shown in FIG. 9 can be employed in the invention. That stator has ten radial poles P1, P2 ... P10 extending inwardly from the peripheral or annular portion of the core. The radial poles are equiangularly spaced around the core so that each pole is diametrically opposite another pole. Windings W1, W2 ... W10 are mounted upon the radial poles in a manner permitting each winding to be individually energized by an electrical signal impressed at T1, T2. . . .or T10. The electrical signals are such that the energized windings always cause their poles to be of the same magnetic polarity. Thus by energizing winding W1, the magnetic field established by the stator is represented by vector A. A 180° opposite magnetic field is established by the stator upon energization of winding W6. The stator of FIG. 9 can therefore establish any of the magnetic fields represented by vectors A to K. With such a stator the rotor need have only one vane. However, by employing an angularly offset vane at each end of the rotor magnet, as depicted in FIG. 9, the initial turning force on the rotor is enhanced and faster indicator response is obtained.

The employment of vanes on the rotor, it has been observed, results in more rapid settling of the rotor to its new station. When the rotor moves to its new station, the rotor, because of its momentum, tends to rotate past the station and then reverse its direction of rotation. A sequence of rotor oscillations then occurs at the station until the rotor comes to rest. The active vane, because of its greater proximity to the stator pole and the resulting greater percentage change in the air gap between the vane and stator pole as the rotor oscillates, provides for damping the rotor oscillations and cause a faster settling of the rotor.

It has also been observed that the use of vanes provides for using a shorter permanent magnet 5 having its pole ends at a greater radial distance from the stator poles and such that the required power for repositioning the rotor can be substantially reduced. This is because the required power is a function, among other factors, of the radial distance between the rotor and stator poles and can be reduced by increasing that distance because the torque required to overcome the attraction of the permanent magnet with the stator poles decreases as that distance increases.

Figure 12:
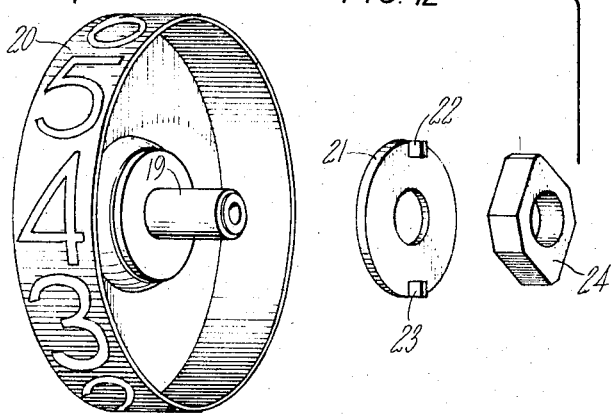
FIG. 12 is a reduced partly exploded perspective view of the rotor assembly of the electromagnetic indicator of FIG. 10.
Figure 11:
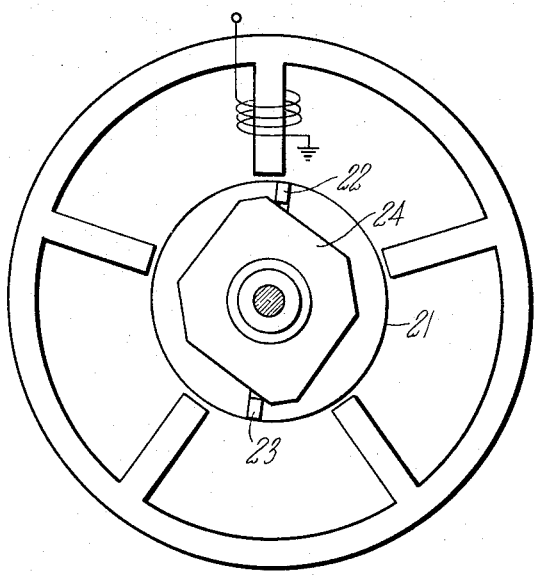
FIG. 11 is a generally schematic side elevation view showing the stator core and rotor magnet and vanes of the electromagnetic indicator of FIG. 10.
Figure 10:
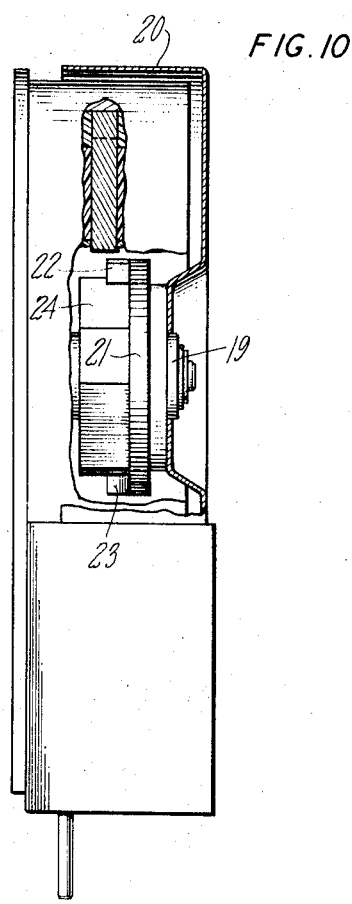
FIG. 10 is an end view, partly broken away and partly in section, of a further embodiment of an electromagnetic indicator incorporating the present invention.

FIGS. 10 to 12 depict another embodiment of a rotor constructed in accordance with the present invention and having a central hub 19 and a symbol bearing drum or wheel 20 made of non-magnetic material such as aluminum secured to the hub 19. A mounting plate 21 made of brass or other suitable non-magnetic material is secured into the hub 19 and has a pair of diametrically opposed peripheral slots for supporting a pair of upstanding flat thin vanes 22 and 23. A permanent magnet 24 is also mounted on the hub 19 and secured to the plate 21 coaxially with the drum 20 and plate 21 and with the vanes touching the edge of the magnet 24. In this regard the vanes 22, 23 have a rectangular cross section as best shown in FIG. 11 and the permanent magnet 24 is located relative to the vanes merely by rotating the permanent magnet on the plate 21 until it contacts the vanes. Although the vanes and permanent magnet have line contact, an effective air gap is established between the vanes and permanent magnet. Such an air gap, though slight, is found to be desirable to prevent the vane from merely being in effect an extension of the permanent magnet and such that its magnetism can be influenced by the stator. Thus the plate 21 provides for assuring correct positioning of the magnet 24 relative to the vanes 22, 23 with the axis of the magnet 24 angularly offset with respect to the diameter passing through the vanes. The vanes 22 and 23 are thin, flat plates of a magnetizable material such as "soft" iron, i.e., iron that does not exhibit appreciable magnetic hysteresis or retentivity. Although the vanes are shown in FIGS. 11 and 13 to be touching the permanent magnet 24, it is not essential that the vanes actually contact the magnet. Also the length of the vanes 22, 23 is chosen to provide the desired effect and as seen in FIG. 10 the vanes do not extend completely across the edge of the permanent magnet 24. A support hub 25 extends centrally through the permanent magnet 24 and carrier plate 21 and is affixed to the drum to complete the rotor. In the assembled device, the rotor turns as a unit about the shaft 14 (FIG. 2) and is positioned by the stator in the manner of the rotor previously described.

The invention can be embodied in forms other than those here illustrated or described. The stator, for example, need only be capable of establishing magnetic fields that are 180° opposite in direction and have the equivalent of radial poles when the stator is deenergized to retain the rotor in position. It is obvious to those knowledgeable in the science of magnetics that the positions of the vanes need not be those illustrated in the drawings. Changes in the location and shape of the vanes and changes in the shape of the stator and rotor poles can be made without departing from the teaching of the present invention. It is, of course, apparent that the vane elements ought not to be aligned with the magnetic axis of the permanent magnet, as some angular offset is necessary to provide the desired torque with 180° reversal of the stator's field occurs. The vane elements, which have been illustrated as thin flat plates, can be in the form of cylindrical pins or other shapes. The form of the vane, its mass, its composition, its angular and radial position relative to the permanent magnet, and its proximity to the rotor magnet pole, all have an effect upon the operation that ensues.

Because the invention can be embodied in varied forms, it is not intended that the invention be limited to the forms here illustrated and described. Rather, it is intended that the invention be delimited by the appended claims and include those structures that do not fairly depart from the essence of the invention.

I claim:

1. In a rotary electromagnetic indicator having a stator with a ferromagnetic core with at least one salient pole and means for selectively magnetizing the stator core to selectively establish substantially reverse magnetic fields through the stator pole and a rotor indicator having a permanent magnet with substantially diametrically spaced salient magnetic poles of opposite polarity and a diametrically extending magnetic axis and mounted to be rotated in general alignment with the stator pole with an air gap therebetween by the magnetic interaction of the stator and rotor magnet and to be rotated approximately 180° by substantially reversing the magnetic field established by the stator through said one salient pole, the improvement wherein the rotor comprises a separate elongated generally radially extending ferromagnetic element of low magnetic retentivity associated with each of the salient poles of the permanent magnet and mounted in close association therewith, each ferromagnetic element lying in a common transverse plane with the associated salient pole of the permanent magnet and being angularly spaced from the associated salient pole of the permanent magnet and extending from adjacent an edge of the associated salient pole of the permanent magnet generally radially outwardly beyond the associated salient pole of the permanent magnet toward the stator pole and generally between the permanent magnet and stator poles and completely to one side of said magnetic axis when the poles are in general alignment, each ferromagnetic element having a circumferential cross section substantially less than and related to the circumferential cross sections of both the stator pole and associated permanent magnet pole such that when the associated permanent magnet pole and stator pole are in general alignment, the ferromagnetic element provides an angularly offset low reluctance path for a portion only of the magnetic field extending between the associated pole of the permanent magnet and the stator pole when the stator pole and the associated rotor pole have opposite magnetic polarity and with the remainder of the magnetic field therebetween passing across the air gap between the associated salient pole of the permanent magnet and the stator pole and the ferromagnetic element is magnetically coupled at least in part to the stator pole when the magnetic field through the stator pole is reversed to rotate the rotor substantially 180°.

* * * * *